(12) United States Patent  
Sanderson et al.

(10) Patent No.: US 8,358,893 B1  
(45) Date of Patent: Jan. 22, 2013

(54) PHOTONIC-POWERED CABLE ASSEMBLY

(75) Inventors: Stephen N. Sanderson, Albuquerque, NM (US); Titus James Appel, Albuquerque, NM (US); Walter C. Wrye, IV, Houston, TX (US)

(73) Assignee: Sandia Corporation, Albuquerque, NM (US)

( * ) Notice: Subject to any disclaimer, the term of this patent is extended or adjusted under 35 U.S.C. 154(b) by 450 days.

(21) Appl. No.: 12/687,652

(22) Filed: Jan. 14, 2010

(51) Int. Cl.
*G02B 6/44* (2006.01)
*H04B 10/12* (2006.01)

(52) U.S. Cl. ........ 385/101; 385/100; 385/114; 385/115; 398/115; 398/137; 398/162

(58) Field of Classification Search .......................... None
See application file for complete search history.

(56) References Cited

U.S. PATENT DOCUMENTS

| | | | | |
|---|---|---|---|---|
| 5,528,409 | A * | 6/1996 | Cucci et al. ...................... | 398/15 |
| 2005/0226625 | A1* | 10/2005 | Wake et al. .................... | 398/115 |
| 2008/0166133 | A1* | 7/2008 | Hsiao ............................. | 398/168 |
| 2009/0016715 | A1* | 1/2009 | Furey ............................. | 398/38 |

OTHER PUBLICATIONS

Werthen, Jan-Gustav, "Powering Next Generation Networks by Laser Light over Fiber", Conference Paper, Optical Fiber Communication Conference, Feb. 24, 2008, Optical Society of America, 3 pages.

* cited by examiner

*Primary Examiner* — Michelle R Connelly
(74) *Attorney, Agent, or Firm* — Daniel J. Jenkins

(57) ABSTRACT

A photonic-cable assembly includes a power source cable connector ("PSCC") coupled to a power receive cable connector ("PRCC") via a fiber cable. The PSCC electrically connects to a first electronic device and houses a photonic power source and an optical data transmitter. The fiber cable includes an optical transmit data path coupled to the optical data transmitter, an optical power path coupled to the photonic power source, and an optical feedback path coupled to provide feedback control to the photonic power source. The PRCC electrically connects to a second electronic device and houses an optical data receiver coupled to the optical transmit data path, a feedback controller coupled to the optical feedback path to control the photonic power source, and a photonic power converter coupled to the optical power path to convert photonic energy received over the optical power path to electrical energy to power components of the PRCC.

19 Claims, 11 Drawing Sheets

US 8,358,893 B1

PHOTONIC-POWERED CABLE ASSEMBLY

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to data communications, and in particular but not exclusively, relates to photonic cables.

BACKGROUND INFORMATION

FIG. 1 illustrates a conventional fiber cable assembly 100 for interconnecting a local device 105 to a remote device 110. Fiber cable assembly 100 includes a local electro-optical transceiver 107, a cable 108, and a remote electro-optical transceiver 109. In safety-critical applications, maintaining electrical isolation between local device 105 and remote device 110 is important. As such, fiber optics (e.g., fiber transmit line 115 and fiber receive line 120) are often employed for transmission of the data signals. Fiber optics provide high bandwidth communication between local device 105 and remote device 110, while also providing electrical isolation between local device circuitry 125 and remote device circuitry 130.

In scenarios where the remote device 110 has a limited power budget (e.g., operating on battery power), it is often necessary to power components of remote electro-optical transceiver 109 over cable 108 from local device 105. Conventionally, this has been accomplished by including a conductive, metal power line 135 within cable 108 to deliver the power. However, inclusion of metal power line 135 undermines a total electrical isolation solution provided by fiber transmit line 115 and fiber receive line 120. As such, either a battery inserted into the remote electro-optical transceiver 109 substitutes for the metal power line, or, a bulky surge protector 140 is incorporated into remote electro-optic transceiver 109. Placing a battery in the remote electro-optical transceiver 109 eliminates the metal power line, but adds a degree of battery maintenance. While providing a measure of protection, surge protector 140 does not provide the same level of electrical isolation as fiber transmit line 115 and fiber receive line 120, which are fabricated of dielectric insulating materials (e.g., glass, plastic).

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method of operation of a photonic-powered cable assembly are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
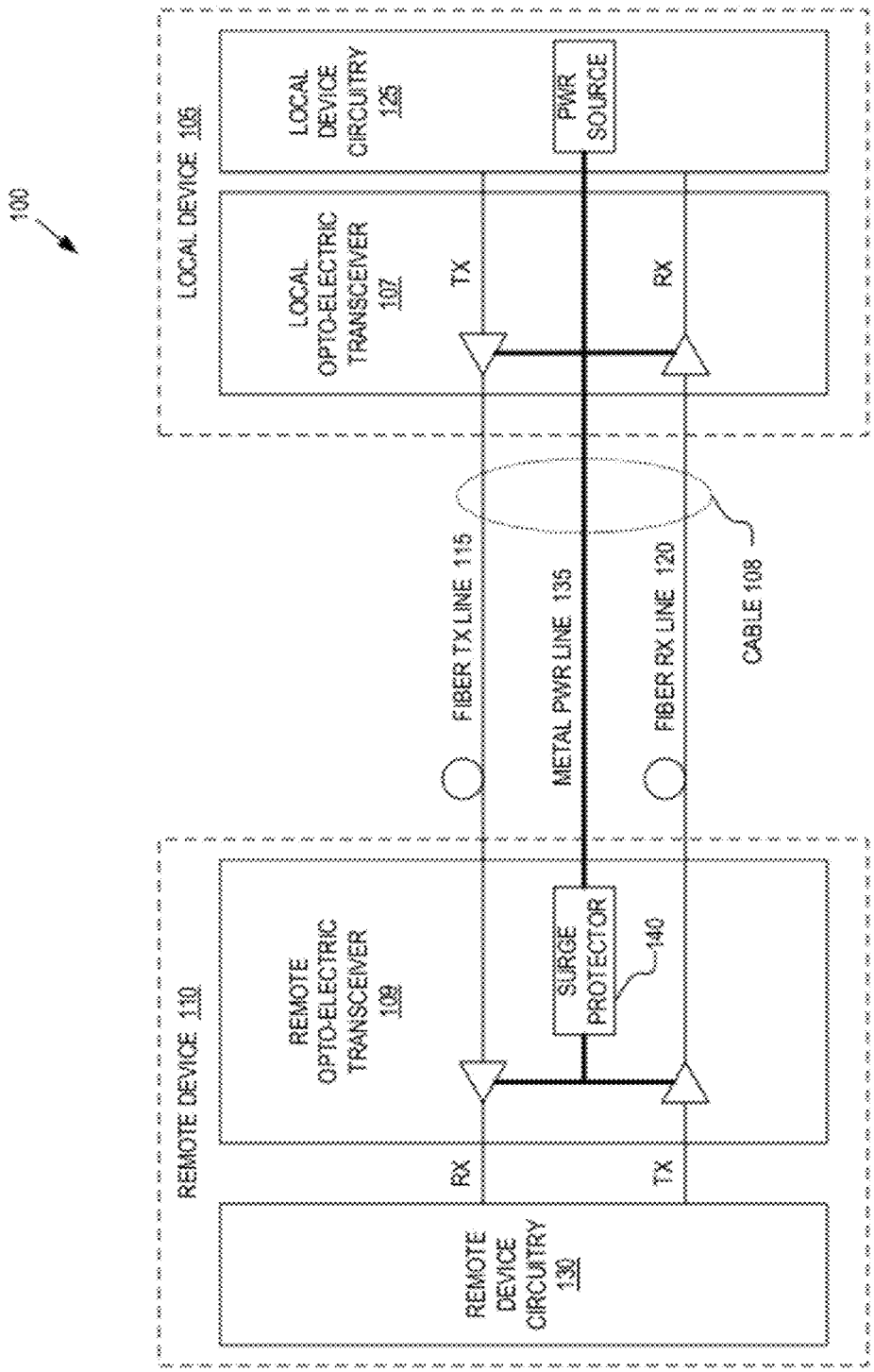
FIG. 1 (PRIOR ART) is a functional block diagram of a conventional fiber cable assembly with metal power lines.
Figure 2:
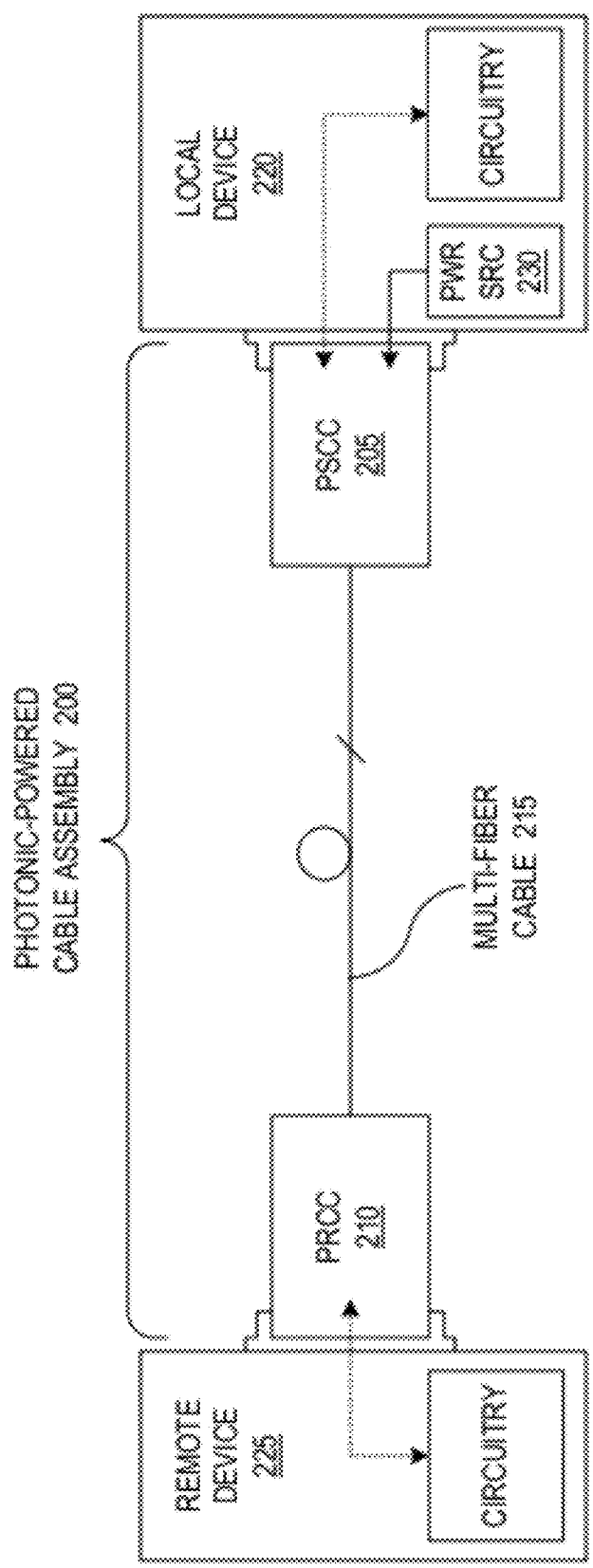
FIG. 2 is a functional block diagram of photonic-powered cable assembly, in accordance with an embodiment of the invention.

FIG. 2 is a functional block diagram of a photonic-powered cable assembly ("PPCA") 200, in accordance with an embodiment of the invention. The illustrated embodiment of PPCA 200 includes a power source cable connector ("PSCC") 205, a power receive cable connector ("PRCC") 210, and a multi-fiber cable 215. In one embodiment, multi-fiber cable 215 includes no metallic conductor paths (e.g., metal power line 135) and therefore PPCA 200 provides total electrical isolation between local device 220 and remote device 225. Due to the total electrical isolation provided by PPCA 200, it is well suited for safety critical or mission critical applications where electrical isolation is desirable.

Furthermore, PPCA 200 is well suited for applications where the power budget of remote device 225 is limited (e.g., remote device 225 operates on battery power, solar cell, or other constrained power source). Embodiments of PPCA 200 are capable of drawing electrical power from power source 230 within local device 220, converting the electrical power to photonic power within PSCC 205 and delivering the photonic power over multi-fiber cable 215 to PRCC 210 where it is converted back to electrical power to run the internal components of PRCC 210. As such, embodiments of PPCA 200 can deliver adequate power over fiber from PSCC 205 to PRCC 210, such that PRCC 210 consumes little or no power from remote device 225 to which it is coupled. In one embodiment, sufficient power may be delivered to PRCC 210 to power circuitry within remote device 225 (e.g., remote wakeup circuitry, low power control systems, etc.). However, in the event of photonic power failure, embodiments of PPCA 200 can further be configured to draw auxiliary power from remote device 225 to maintain data communications. During regular operation, the power delivery is adjustable and enables PRCC 210 to provide continuous, real-time feedback to PSCC 205 to deliver adequate photonic power as needed, while conserving energy when not needed. PPCA 200 adjusts power delivery to automatically account for fiber cable length and breaches. In the illustrated embodiment, PSCC 205 draws its power from power source 230 within local device 220, where power may be readily available or adequate power budget has been allocated to supply PPCA 200. It should be appreciated that PPCC 200 may also be used in applications where electrical isolation and/or limited power are of less concern.

In one embodiment, PSCC 205 and PRCC 210 are mating connectors having physical interfaces that can removably couple (or plug into) to corresponding physical interfaces disposed on local device 220 and remote device 225, respectively. PSCC 205 and PRCC 210 may include industry standard electrical physical interfaces that use industry standard communication protocols (e.g., Controller Area Network (CAN), RS-232, Ethernet, USB, etc.). The components for converting electrical data signals to/from local device 220 and remote device 225 and for delivering photonic energy over multi-fiber cable 215 are housed within the connector shells themselves. As such, PPCC 200 may be interchanged with or retrofit industry standard copper cable assemblies (e.g., Ethernet cable) to provide enhanced electrical isolation, improved electromagnetic noise rejection, and in some cases, greater operational distance or bandwidth.

PPCC 200 can be used to communicate a variety of information or control a variety of remote devices. For example, PPCC 200 can be used to deliver control outputs, control environmental conditions, perform temperature monitoring of the photonic power devices, deliver unique digital cable ID's, control microelectromechanical systems ("MEMS"), control vacuum/pressure pumps, control rotational/linear shaft actuators, control various position, environmental, or continuity sensors, or otherwise.

Figure 3A:
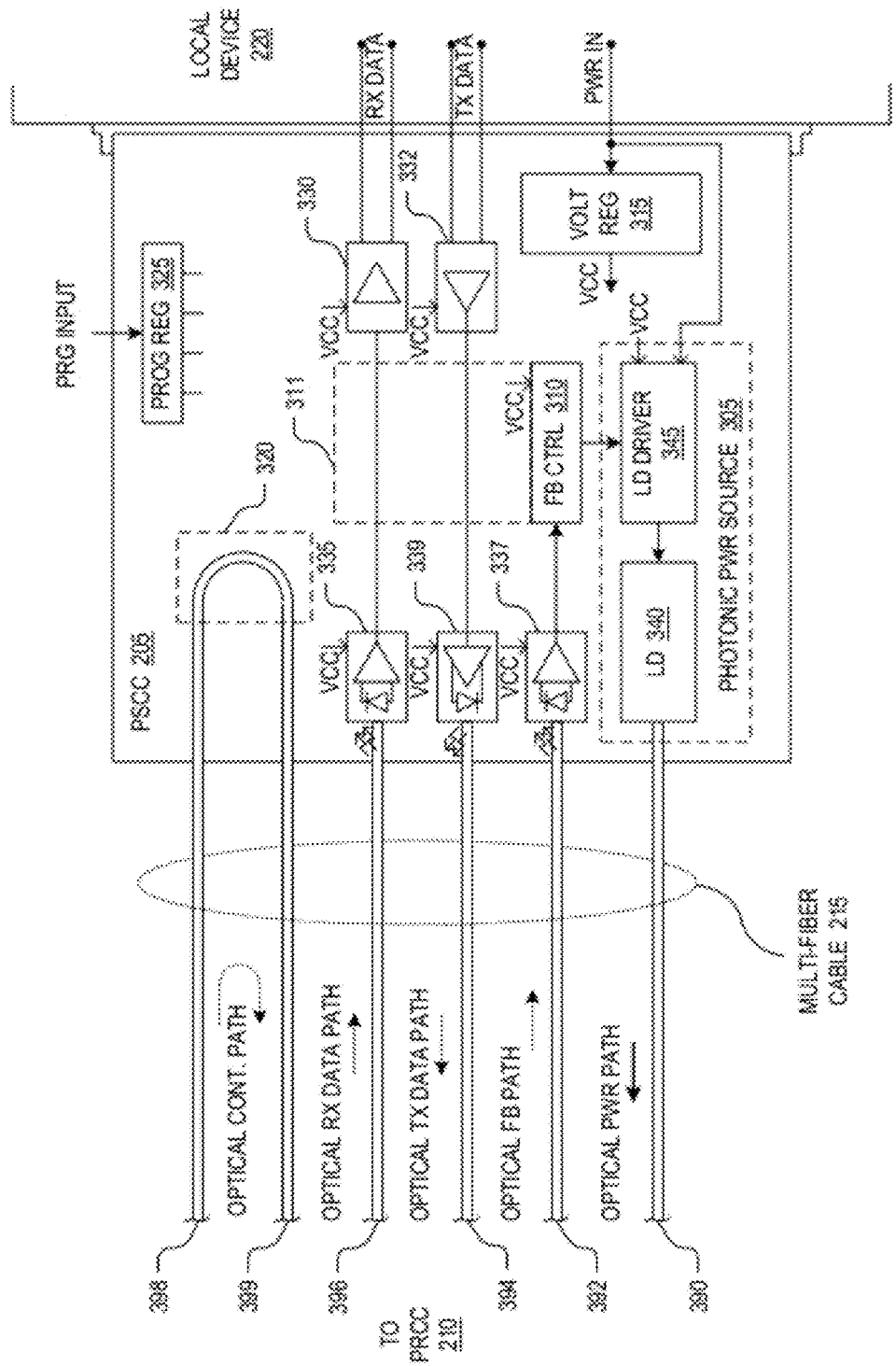
FIG. 3A is a functional block diagram illustrating internal components of a power source cable connector, in accordance with an embodiment of the invention.
Figure 3B:
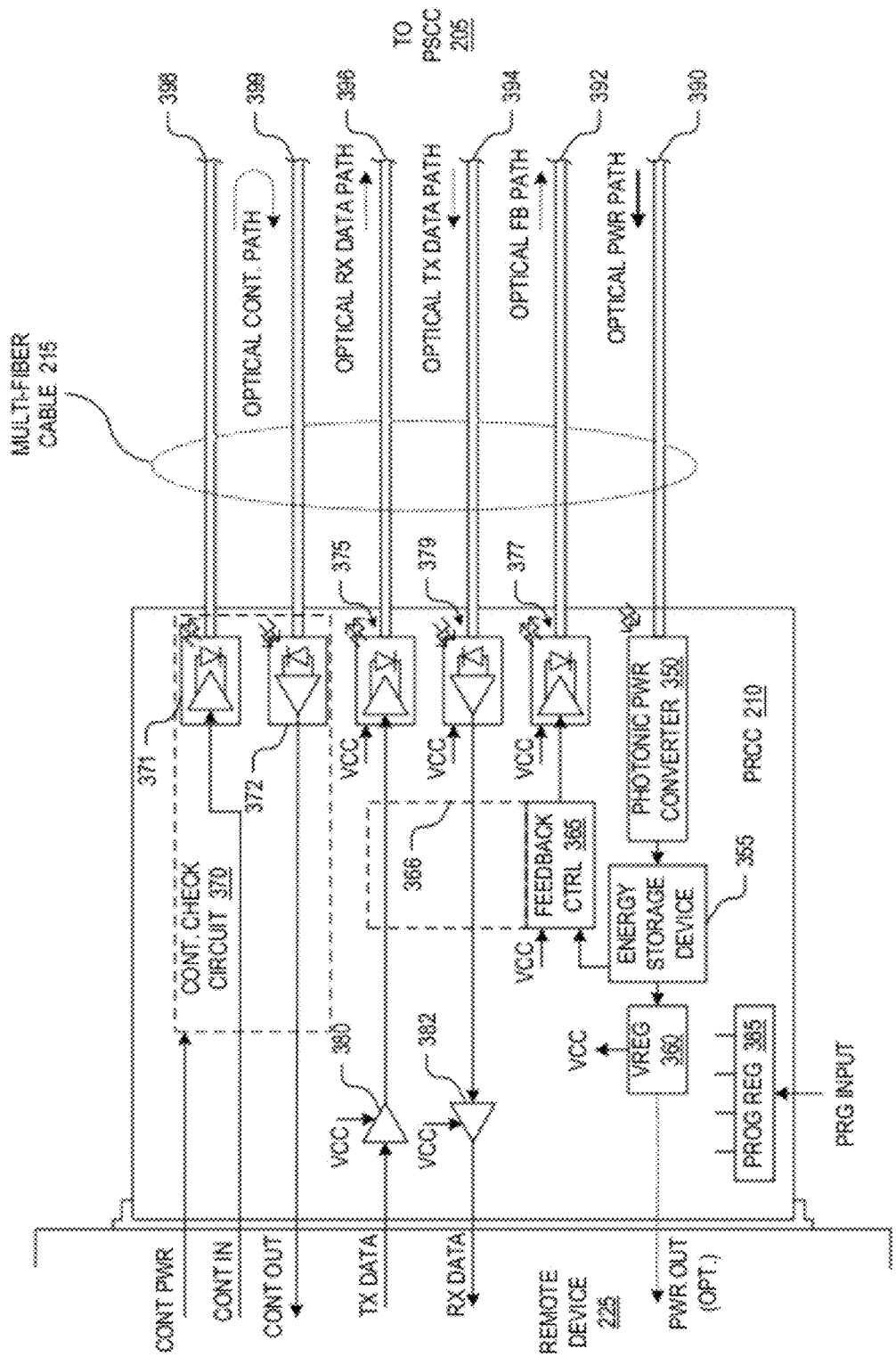
FIG. 3B is a functional block diagram illustrating internal components of a power receive cable connector, in accordance with an embodiment of the invention.

FIGS. 3A and 3B are functional block diagrams illustrating internal components of a PSCC 205, PRCC 210, and multi-fiber cable 215, in accordance with an embodiment of the invention. The illustrated embodiment of PSCC 205 (see FIG. 3A) includes a photonic power source 305, a feedback controller 310, a voltage regulator 315, an optical coupler 320, programmable registers 325, differential drivers 330 and 332, optical receivers 335 and 337, and an optical transmitter 339. The illustrated embodiment of photonic power source 305 includes a laser diode ("LD") 340 and LD driver 345.

Voltage regulator 315 and laser driver 345 are coupled to receive power from power source 230. Voltage regulator 315 generates one or more supply voltages (e.g., VCC illustrated in FIG. 3A) for the operation of the internal components of PSCC 205 and power control delivery to PRCC 210. In one embodiment, voltage regulator 315 operates as a voltage converter generating VCC from a different voltage level supplied by power source 230. In one embodiment, voltage regulator 315 is configurable to generate different supply voltages and may even be capable of outputting multiple concurrent values (e.g., 3V and 5V). Voltage regulator 315 may be coupled to program registers 325 and configured by appropriate bit programming of program registers 325. Voltage regulator 315 may be programmed to select different supply voltages to accommodate different communication protocols, to enter a low power sleep or suspend states, to enter a low speed/bandwidth states, or otherwise. In one embodiment (not illustrated), pinouts are provided for programming registers 325 to facilitate laser power adjustments, enabling/disabling LD 340, and monitoring a temperature of photonic power source 305 via an embedded thermistor (not illustrated).

Embodiments of optical receivers 335 and 337 may include photosensitive receivers (e.g., photodiodes, phototransistor) coupled to trans-impedance amplifiers ("TIAs"). Correspondingly, embodiments of optical transmitter 339 include a TIA, buffer, driver, etc. coupled to an optical source, such as a fiber optic transmitter diode, or laser diode. The illustrated embodiment of PSCC 205 is configured to output and input differential signals to/from local device 220 using differential drivers/receivers 330 and 332, respectively. However, other embodiments may output/input single-ended signals and as such may omit differential drivers 330 and 332 and/or replace them with line buffers. In one embodiment, some or all of differential drivers 330 and 332, optical receivers 335 and 337, and optical transmitter 339 may be part of a family of commercial integrated circuits that accommodate various communication protocols, fiber lengths, signal strengths or these components could be coupled to programmable registers 325 to program operational characteristics (e.g., timing, frequency, voltage swing levels, amplification gain, etc).

In one embodiment, LD 340 is a laser diode and LD driver 345 is implemented as a voltage controlled current source for driving LD 340. The control voltage for controlling LD driver 345 is generated by feedback controller 310, which in turn is responsive to a feedback control signal from PRCC 210. In one embodiment, feedback controller 310 is a multi-vibrator that generates a drive signal having a default duty cycle (e.g., 20 percent duty cycle). The default duty cycle may be increased or decreased responsive to the feedback control signal. In one embodiment, default duty cycle is the maximum operational duty cycle for LD driver 345 and the feedback control signal is used by feedback controller 310 to gate or otherwise reduce the default duty cycle. In an alternative embodiment, the default duty cycle is the minimum operational duty cycle for LD driver 345 and the feedback control signal is used by feedback controller 310 to increase the duty cycle. In another embodiment, feedback controller 310 provides a safety cutoff circuit. In this embodiment, if feedback controller 310 fails to detect a feedback control signal from PRCC 210 after a predetermined interval, then a malfunction of PRCC 210 or cable breach may be assumed and the photonic power source 305 disabled. In yet another embodiment, feedback controller 310 is a microcontroller coupled to perform the various control modes described above, and includes logic for controlling the data transmission between local device 220 and PRCC 210, as illustrated by dashed line 311 in FIG. 3A. In one embodiment, feedback controller 310 provides an "AUTO-ON" control voltage for controlling LD driver 345 in response to sensing an input data signal at differential driver 332 or on optical receive data path 396 in conjunction with energy storage device 355 reaching a sufficient charge level.

The illustrated embodiment of optical coupler 320 couples outbound optical continuity path 398 to return optical continuity path 399. Optical coupler 320 may be implemented as a mirror to reflect the continuity signal between the two paths or a bent waveguide that simply couples the two optical paths. In some embodiments, optical coupler 320 may reside in PRCC 210 while continuity check circuit 370 (see FIG. 3B) may reside in PSCC 205. In embodiments where a continuity check circuit is incorporated into PSCC 205, it may be used to implement a laser eye safety mechanism that disables photonic power source 305 in the event a fiber breach is detected.

The illustrated embodiment of PRCC 210 (see FIG. 3B) includes a photonic power converter 350, an energy storage device 355, a voltage regulator 360, a feedback controller 365, a continuity check circuit 370, optical transmitters 375 and 377, optical receiver 379, buffers 380 and 382, and programmable registers 385. The illustrated embodiment of continuity check circuit 370 includes optical transmitter 371 and optical receiver 372.

Figure 3C:
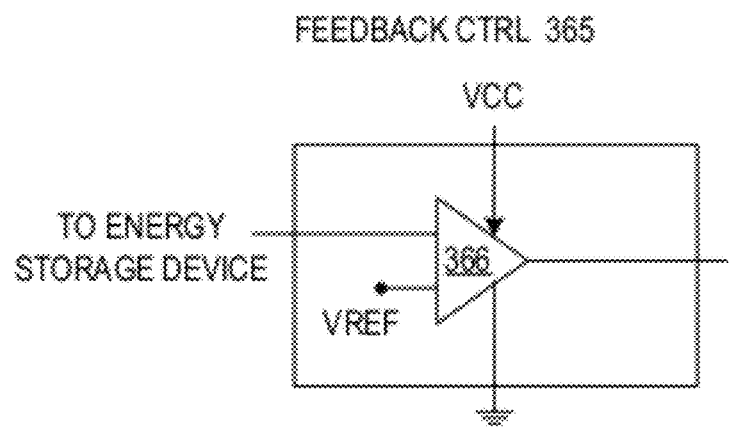
FIG. 3C is a functional block diagram illustrating internal components of a feedback controller, in accordance with an embodiment of the invention.

Photonic power converter 350 is coupled to optical power path 390 to receive photonic power from photonic power source 305. Photonic power converter 350 converts the photonic power to electrical power and is coupled to charge energy storage device 355 (e.g., super-capacitor). Voltage regulator 360 is coupled to energy storage device 355 and draws electrical power from either energy storage device 355 or photonic power converter 350 to generate one or more supply voltages (e.g., VCC in FIG. 3B) for powering the internal components of PRCC 210 and in some embodiments may even supply limited power to remote device 225 via an optional PWR OUT pin. Feedback controller 365 is also coupled to energy storage device 355 to monitor its charge level and provide real-time feedback over optical feedback path 392 to feedback controller 310. In one embodiment, feedback controller 365 includes a voltage comparator 366 (see FIG. 3C) coupled to compare the voltage across energy storage device 355 to a reference voltage Vref. In one embodiment, an analog-to-digital ("ADC") is used to implemented feedback controller 365. In another embodiment, feedback controller 365 is a microcontroller that executes the feedback control functionality, the continuity check, and controls data transmission protocols between remote device 225 and PSCC 205, as shown by dashed line 366 in FIG. 3B.

Optical receivers 372 and 379 may be implemented with photosensitive receivers (e.g., photodiodes, phototransistors) coupled to a TIAs. Correspondingly, embodiments of optical transmitters 371, 375 and 377 each include a TIA, buffer, driver, etc. coupled to an optical source, such as a fiber optic transmitter diode or laser diode. The illustrated embodiment of PRCC 210 is configured to output and input single-ended signals to/from remote device 225 via buffers 382 and 380, respectively. However, other embodiments may output/input differential signals by the inclusion of differential drivers.

In one embodiment, some or all of buffers 380 and 382, optical receiver 379, and optical transmitter 375 may be part of a family of commercial integrated circuits that accommodate various communication protocols, fiber lengths, signal strengths or these components could be coupled to programmable registers 325, etc., to provide programmable/selectable timing, frequency, voltage swing levels, amplification gain, etc. Furthermore, programmable register 385 may be coupled to voltage regulator 360 to select and adjust a level of supply voltage VCC and/or coupled to feedback controller 365 to select and adjust the reference voltage Vref.

The illustrated embodiment of continuity check circuit 370 is powered by remote device 225 via the continuity power input (CONT PWR). The logic for driving optical transmitter 371 (CONT IN), processing the output of optical receiver 372 (CONT OUT), and identifying a loss of continuity or cable integrity is also included within remote device 225. However, embodiments of continuity check circuit 370 may include continuity check logic for identifying a loss of signal on the return optical continuity path and signaling the optical transmitters 371, 375, and 377 to shut down or otherwise enter an eye safety level of operation. In one embodiment, the continuity check logic may include threshold logic that monitors for a loss or drop in the CONT OUT signal. In one embodiment, continuity check circuit 370 is auxiliary-powered by VREG 360.

Figure 3D:
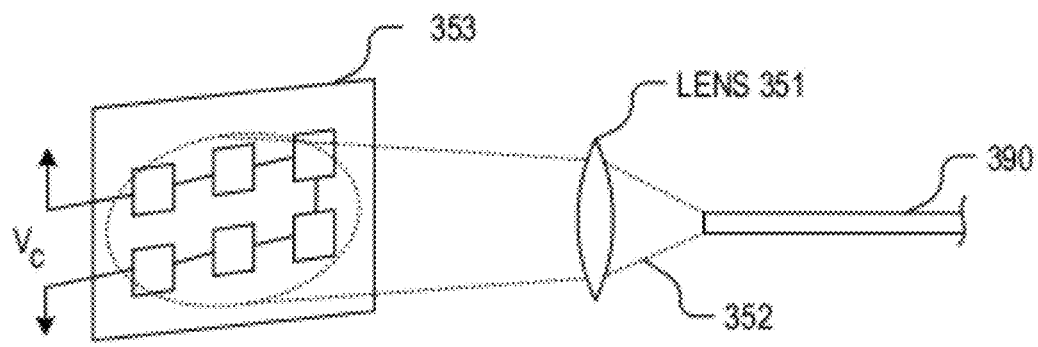
FIG. 3D is a functional block diagram illustrating internal components of a photonic power converter, in accordance with an embodiment of the invention.

FIG. 3D is a functional block diagram illustrating internal components of photonic power converter 350, in accordance with an embodiment of the invention. The illustrated embodiment includes a lens 351 for collimating light 352 emitted from optical power path 390. The collimating light is focused onto an array of photocells 353, which convert the photonic power into electric power coupled to charge energy storage device 355 with a charging voltage Vc and provide regulator input to VREG 360. Although FIG. 3D illustrates six photocells coupled in series, it should be appreciate that array of photocells 353 may include more or less cells coupled in series or parallel. Other photonic power converting structures may also be used, such as, photodiodes and the like. In one embodiment, lens 351 is omitted and a miniaturized solar cell array is positioned to be illuminated from the direct output of a single or multi-mode fiber.

The illustrated embodiment of multi-fiber cable 215 (see FIG. 3A or 3B) includes an optical power path 390, an optical feedback path 392, an optical transmit data path 394, an optical receive data path 396, an outbound optical continuity path 398, and a return optical continuity path 399. Although multi-fiber cable 215 is illustrated as having six distinct fibers, it should be appreciated that embodiments of multi-fiber cable 215 may be implemented with more or less fibers. For example, optical TX/RX data paths 394 and 396 may be multiplexed on a single bi-directional fiber, or each optical TX/RX data path 394 and 396 may be implemented over multiple fibers for increased bandwidth. Similarly, the other optical paths may share a single fiber or be spread across multiple fibers.

Figure 4:
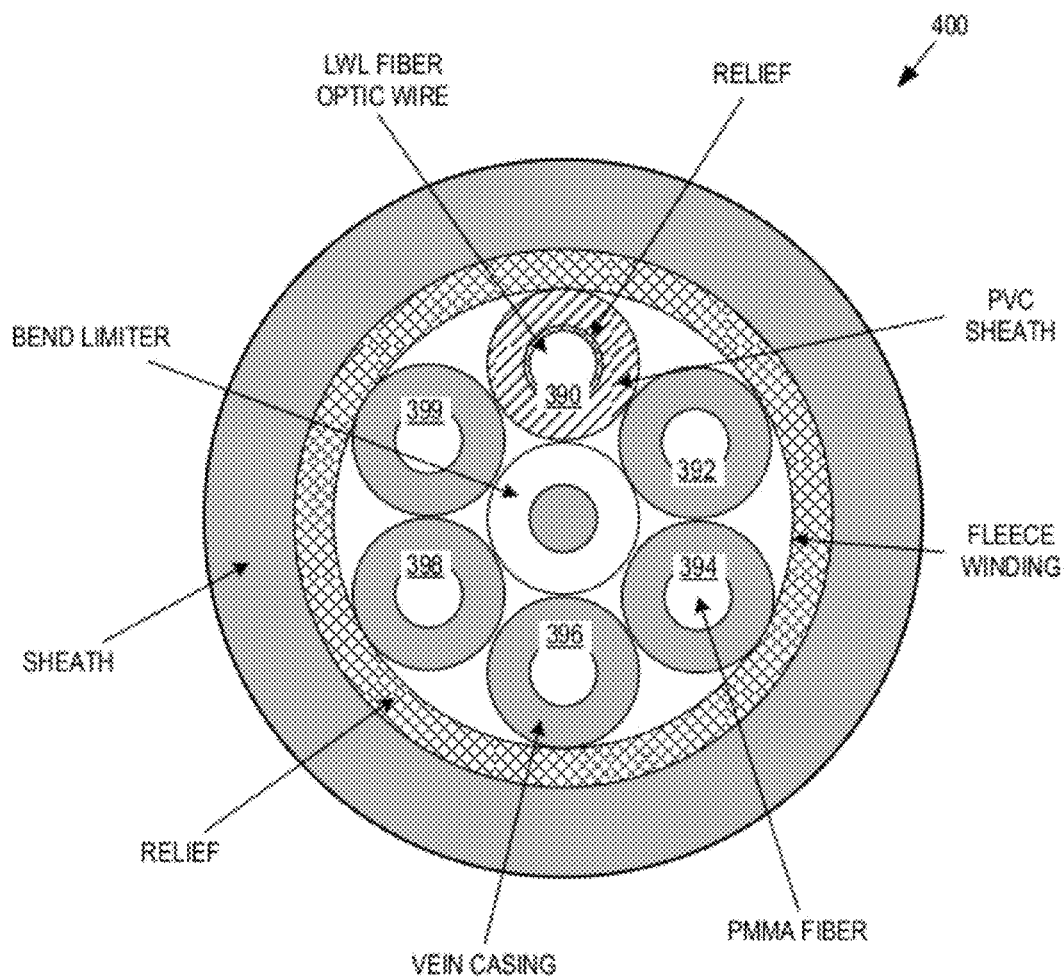
FIG. 4 is a cross-sectional view of a fiber cable of a photonic-power cable assembly, in accordance with an embodiment of the invention.

FIG. 4 illustrates a cross sectional view of a multi-fiber cable 400, in accordance with an embodiment of the invention. Multi-fiber cable 400 represents one possible implementation of multi-fiber cable 215. In one embodiment, optical power path 390 is implemented using a glass core fiber, while optical feedback path 392, optical transmit data path 394, optical receive data path 396, outbound optical continuity path 398, and return optical continuity path 399 are implemented with plastic core fibers. Of course, multi-fiber cable 215 may be fabricated using other materials and/or material combinations.

Figure 5:
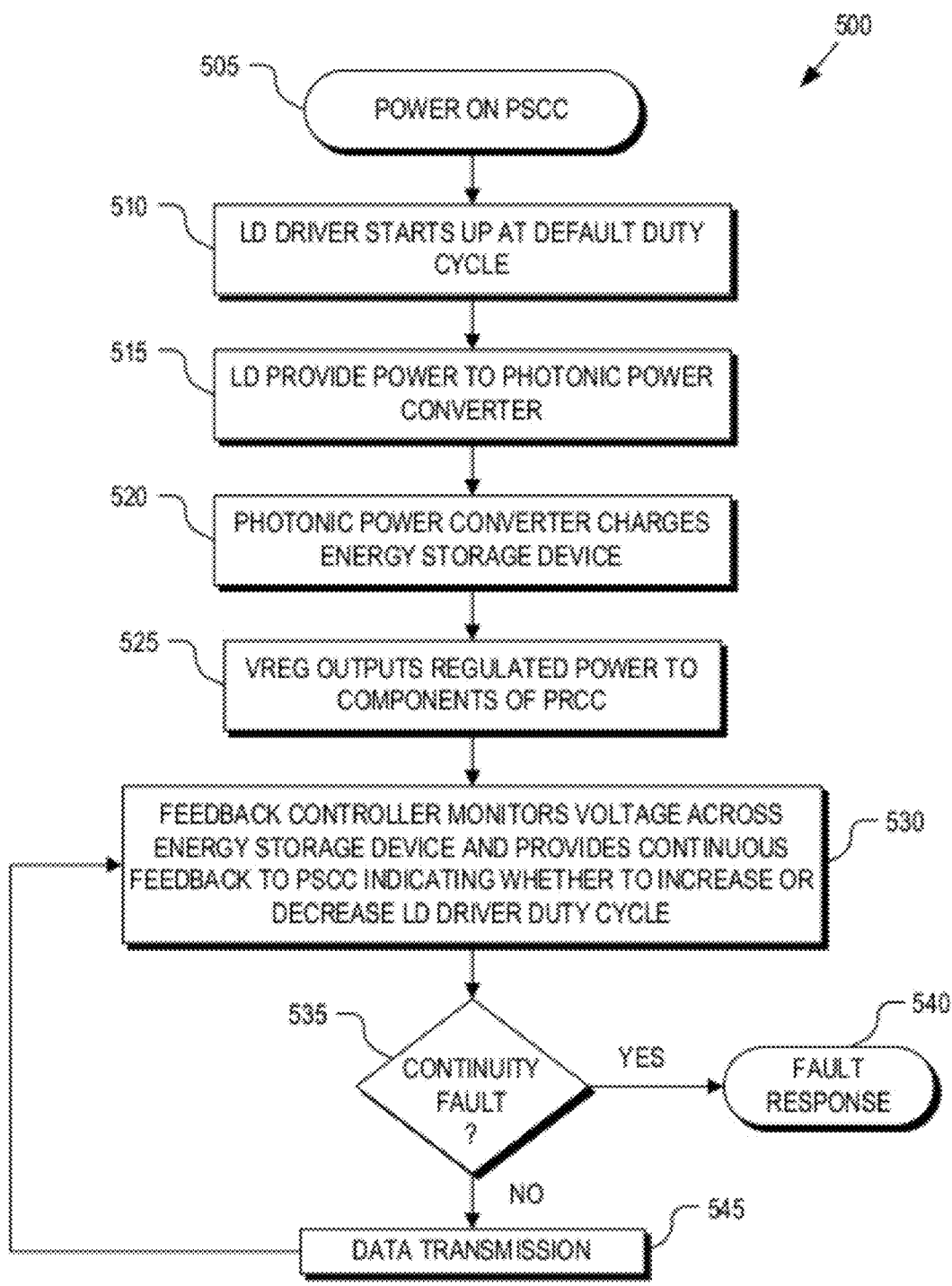
FIG. 5 is a flow chart illustrating a process of operation of a photonic-power cable assembly, in accordance with an embodiment of the invention.

FIG. 5 is a flow chart illustrating a process 500 for operation of PPCA 200, in accordance with an embodiment of the invention. The order in which some or all of the process blocks appear in process 500 should not be deemed limiting. Rather, one of ordinary skill in the art having the benefit of the present disclosure will understand that some of the process blocks may be executed in a variety of orders not illustrated.

In a process block 505, PSCC 205 is powered on. Power is delivered to PSCC 205 from power source 230 within local device 220. In one embodiment, voltage regulator 315 translates the external power voltage to one or more internal power voltages. Once power is supplied, LD driver 345 commences delivering a drive current to LD 340 with a default duty cycle (process block 510).

In a process block 515, LD 340 commences delivering power to PRCC 210 by injecting an optical energy into optical power path 390. Optical power path 390 guides the photonic energy to photonic power converter 350 within PRCC 210. The photonic energy may be delivered using a variety of photonic wavelengths including the infrared spectrum, visible spectrum, ultraviolet spectrum, or otherwise. In a process block 520, the photonic power of the impingent photonic energy signal is converted to electrical power for charging energy storage device 355 and providing input to the VREG 360.

In a process block 525, voltage regulator 360 commences generating internal supply voltage VCC once energy storage device 355 reach a sufficient charge level for proper operation. The supply voltage VCC generated by voltage regulator 360 is coupled to power the internal components of PRCC 210, such as feedback controller 365, optical transmitters 375 and 377, optical receiver 379, and buffers 380 and 382. In one embodiment, voltage regulator 360 may even be coupled to power continuity check circuit 370.

In a process block 530, once supply voltage VCC reaches its operational voltage level, feedback controller 365 commences monitoring the charge level or voltage across energy storage device 355. In response to the monitoring, feedback controller 365 provides real-time feedback to feedback controller (FB CTRL 310) within PSCC 205. For example, if the internal circuitry of PRCC 210 draws down the charge or voltage within energy storage device 355 below a threshold level, then feedback controller 365 signals feedback controller (FB CTRL 310) via optical feedback path 392 to increase the power delivery. This may be accomplished by feedback controller 310 by a variety of techniques. For example, feedback controller (FB CTRL 310) may increase the duty cycle of LD driver 345 and/or feedback controller (FB CTRL 310) may cause LD driver 345 to increase the intensity of LD 340 by increasing the drive current. If the power delivery to PRCC 210 exceeds the power consumption of PRCC 210 for a period of time, the charge or voltage across energy storage device 355 may exceed a threshold level. In this event, feedback controller 365 may signal to feedback controller (FB CTRL 310) to decrease or throttle the duty cycle of LD driver 345. In one embodiment, the feedback signal may be used to gate a multi-vibrator control signal. The threshold charge/voltage level used to signal an increase in power delivery may be the same or different threshold charge/voltage level used to signal a decrease in power delivery. In one embodiment, hysteresis is applied to the threshold levels such that the decrease power supply threshold level is higher than the increase power supply threshold level. In yet other embodiments, comparator thresholds are not used, but rather a target charge level is achieved with a gradual and continuous feedback signal using a PID (position, integration, differentiation) controller or otherwise. In one embodiment, an analog-to-digital converter provides a real-time feedback of the charge level of energy storage device 355.

During operation, continuity check circuit 370 generates an optical continuity signal on the outbound path 398 and continuously monitors the return path 399 for any disruption in the signal. If a sufficient disruption or complete loss of the signal is detected (decision block 535), then a continuity fault is issued and a fault response executed (process block 540). The fault response may be executed by remote device 225, PRCC 210, and/or PSCC 205. In one embodiment, the fault response is to terminate operation of one or more of remote device 225, PRCC 210, and/or PSCC 205. In embodiments where the continuity check circuit is included within PSCC 205, the continuity check mechanism may be used to implement a laser eye safety mechanism to disable photonic power source 305 and optical transmitter 339. A disruption in the continuity signal may be interpreted as a breach in the multi-fiber cable 200. If continuity is maintained, then data transmission between local device 220 and remote device 225 over PPCA 200 may commence (process block 545). It should be appreciated that in some embodiments, PPCA 200 may be configured to continue data transmission even in the presence of one or more continuity faults or the loss of photonic power delivery from PSCC 205 (e.g., auxiliary power may be drawn from remote device 225).

Figure 6:
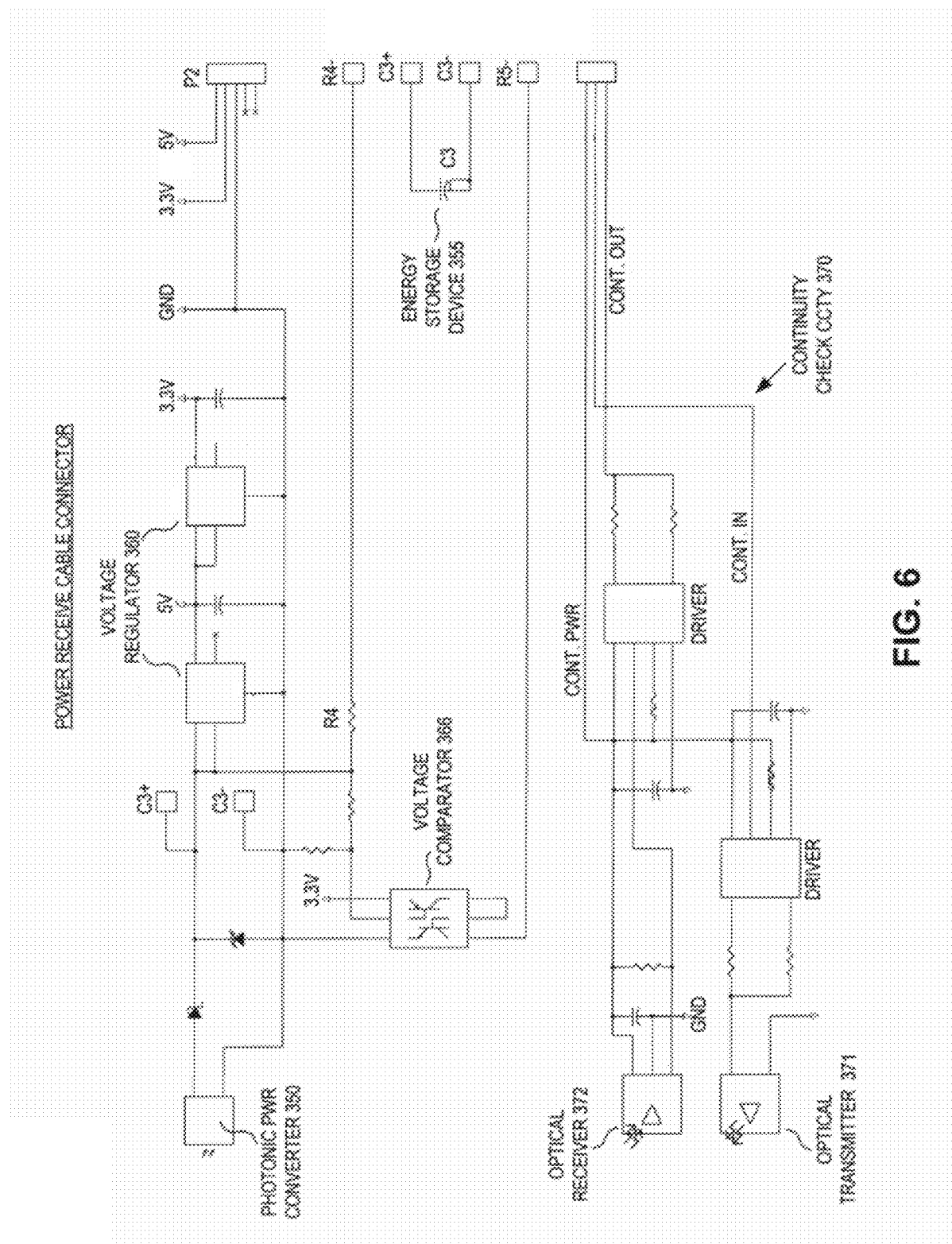
FIG. 6 is a circuit diagram of a first portion of the internal components of an example power receive cable connector, in accordance with an embodiment of the invention.
Figure 7:
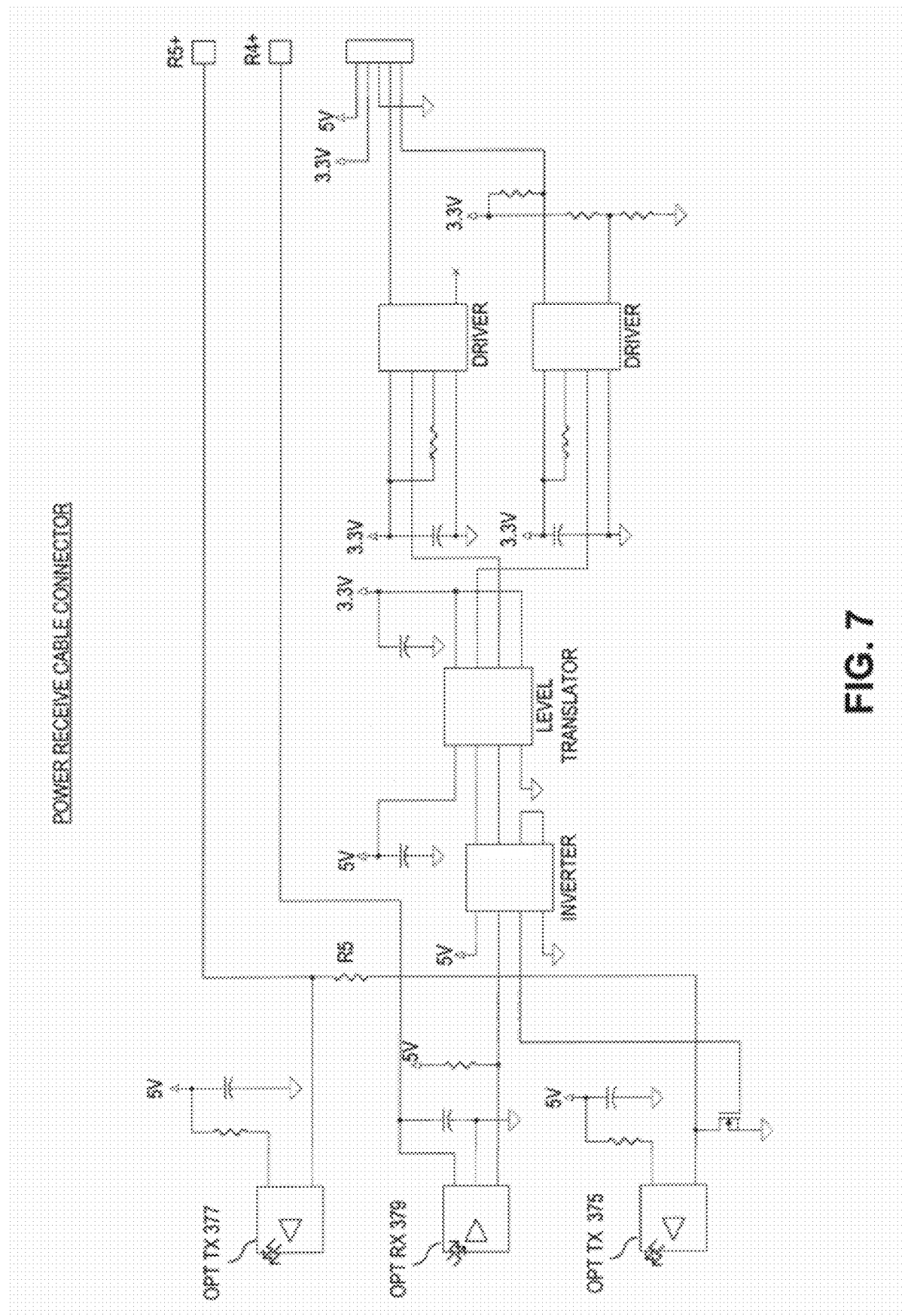
FIG. 7 is a circuit diagram of a second portion of the internal components of an example power receive cable connector, in accordance with an embodiment of the invention.

FIGS. 6 and 7 illustrate example circuit diagrams of first and second portions of the internal components of PRCC 210, in accordance with an embodiment of the invention. It should be appreciated that FIGS. 6 and 7 illustrate only one possible implementation of PRCC 210 and its internal components. FIGS. 6 and 7 have been labeled to show correspondence with the functional components illustrated in FIG. 3B for the sake of description; however, the functional elements illustrated in FIG. 3B are intended to represent broader functional elements, which may be implemented with a variety of other circuit components and configurations than illustrated in the specific example of FIGS. 6 and 7, such as A/D converters and microcontrollers.

Figure 8:
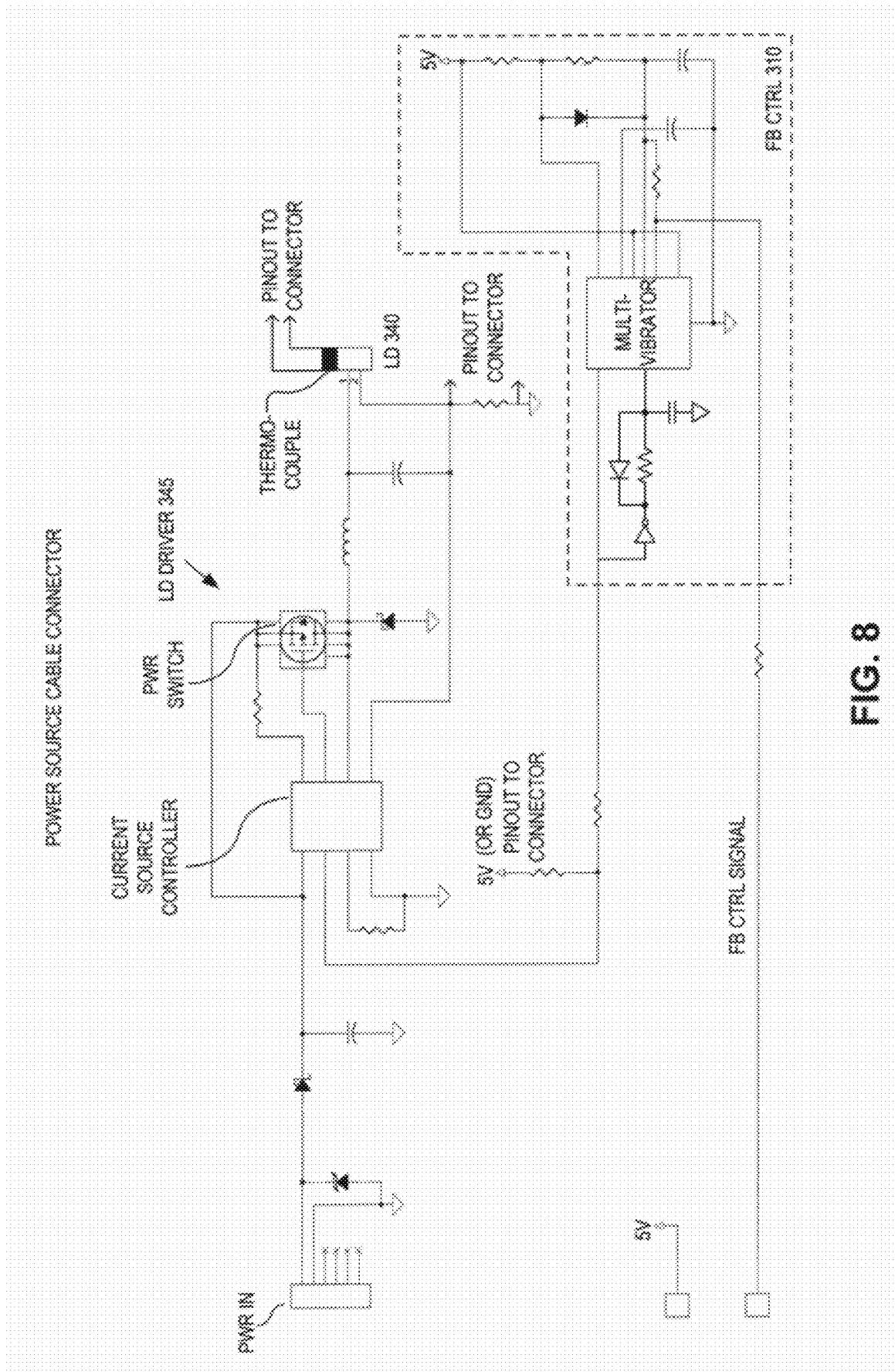
FIG. 8 is a circuit diagram of a first portion of the internal components of an example power source cable connector, in accordance with an embodiment of the invention.
Figure 9:
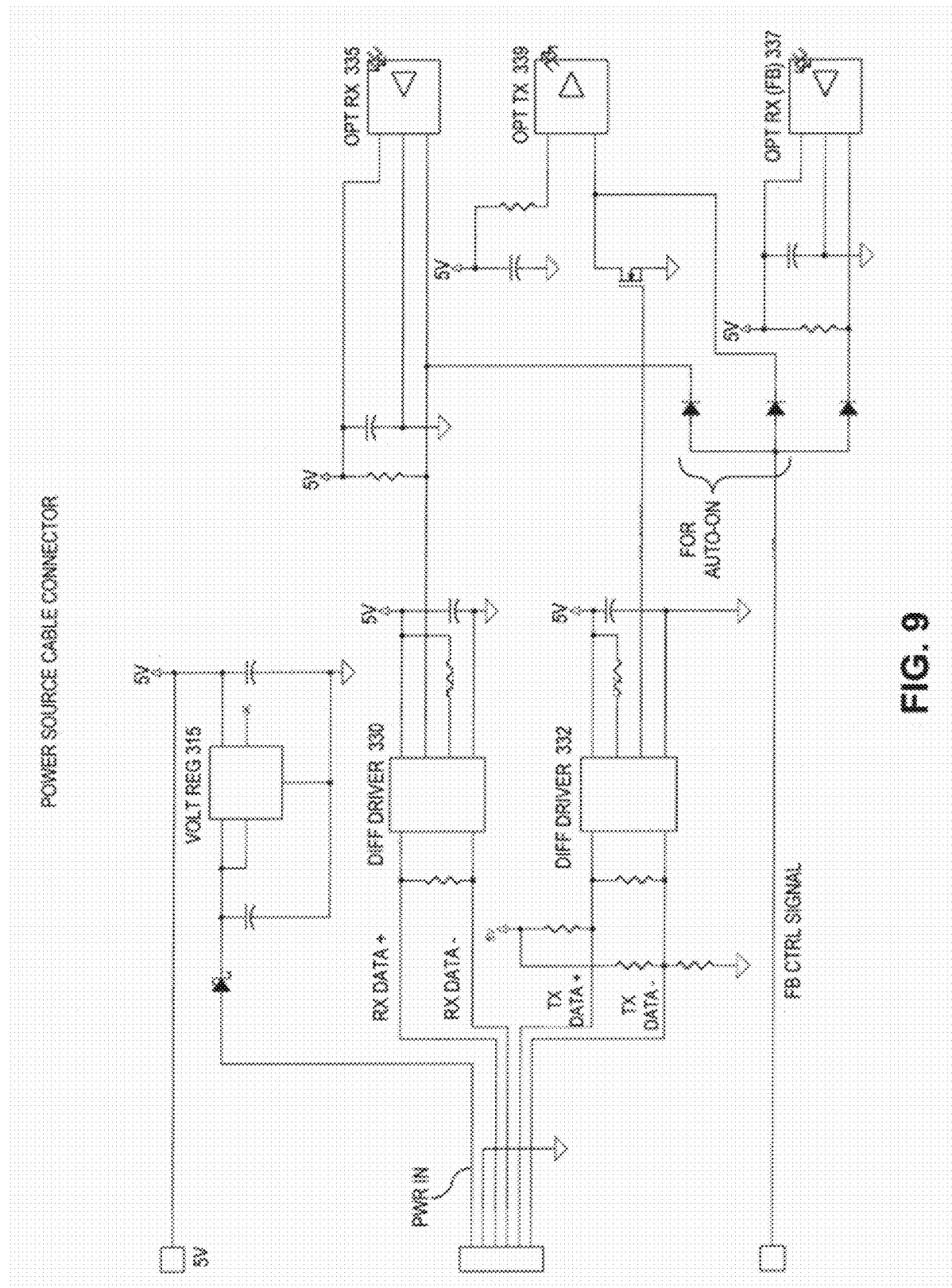
FIG. 9 is a circuit diagram of a second portion of the internal components of an example power source cable connector, in accordance with an embodiment of the invention.

FIGS. 8 and 9 illustrates example circuit diagrams of first and second portions of the internal components of PSCC 205, in accordance with an embodiment of the invention. It should be appreciated that FIGS. 8 and 9 illustrate only one possible implementation of PSCC 205 and its internal components. FIGS. 8 and 9 have been labeled to show correspondence with the functional components illustrated in FIG. 3A for the sake of description; however, the functional elements illustrated in FIG. 3A are intended to represent broader functional elements, which may be implemented with a variety of other circuit components and configurations than illustrated in the specific example of FIGS. 8 and 9, such as A/D converters and microcontrollers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A cable assembly, comprising:
  a power source cable connector ("PSCC") for electrically connecting to a first electronic device, the PSCC housing a photonic power source and a first optical data transmitter;
  a fiber cable coupled to the PSCC including an optical transmit data path coupled to the first optical data transmitter, an optical power path coupled to the photonic power source, and an optical feedback path coupled to provide feedback control to the photonic power source, and
  a power receive cable connector ("PRCC") for electrically connecting to a second electronic device and coupled to the fiber cable, the PRCC housing a first optical data receiver coupled to the optical transmit data path, a first feedback controller coupled to the optical feedback path to control the photonic power source, and a photonic power converter coupled to the optical power path to convert photonic energy received over the optical power path to electrical energy to power the optical data receiver and the first feedback controller;

wherein the first and second connector housing are configured to feed back the optical control signal from the second connector housing to the first connector housing to control the power level of the optical power to adequately power the components of the second connector housing by monitoring a voltage level across a storage capacitor, comparing the voltage level to a reference voltage, and generating the optical control signal to indicate to the first connector housing to increase the power level when the voltage level drops below the reference voltage.

2. The cable assembly of claim 1, wherein the PSCC further houses a second feedback controller coupled to control a duty cycle of the photonic power source in response to a feedback control signal received from the PRCC over the optical feedback path.

3. The cable assembly of claim 2, wherein the PRCC further houses an energy storage device coupled to the photonic power converter to store the electrical energy, wherein the first feedback controller is coupled to monitor an energy level of the energy storage device and to generate the feedback control signal based on the energy level of the energy storage device.

4. The cable assembly of claim 3, wherein the PRCC further houses a voltage regulator coupled to the energy storage device, the voltage regulator coupled to provide a supply voltage to the optical data receiver and the first feedback controller.

5. The cable assembly of claim 2, wherein the photonic power source comprises:
a laser diode ("LD") optically coupled to the optical power path; and
a LD driver coupled to drive the LD, wherein the second feedback controller is coupled to control the duty cycle of the LD driver.

6. The cable assembly of claim 2, wherein the second feedback controller comprises a multi-vibrator responsive to the feedback control signal.

7. The cable assembly of claim 1,
wherein the PSCC further houses a second optical data receiver,
wherein the fiber cable further includes an optical receive data path coupled to the second optical data receiver, and
wherein the PRCC further houses a second optical data transmitter coupled to the optical receive data path.

8. The cable assembly of claim 1, wherein fiber cable includes an optical continuity path having an outbound path and a return path, the cable assembly further comprising:
a continuity check circuit housed within one of the PRCC or the PSCC and coupled to the continuity path, the continuity check circuit coupled to generate and to monitor a continuity signal on the optical continuity path to determine whether an integrity of the fiber cable has been compromised.

9. The cable assembly of claim 1, further comprising a programmable registers housed within at least one of the PRCC or the PSCC, the programmable registers for configuring one or more components within the at least one of the PRCC and the PSCC.

10. The cable assembly of claim 1, wherein the PSCC further houses a voltage regulator for coupling to a power source within the first electronic device and for providing a regulated power to the photonic power source.

11. A method of operation of a photonic-powered cable assembly ("PPCA") coupled between first and second electrical devices, the method comprising:
converting electrical power received from the first electrical device to optical power within the first connector housing;
delivering the optical power to a second connector housing of the PPCA via a first optical fiber;
powering components within a second connector housing of the PPCA with the optical power;
feeding back an optical control signal from the second connector housing to the first connector housing to control a power level of the optical power to adequately power the components of the second connector housing; and
communicatively interconnecting the first and second electrical devices via the PPCA over one or more data optical fibers;
wherein feeding back the optical control signal from the second connector housing to the first connector housing to control the power level of the optical power to adequately power the components of the second connector housing comprises:
monitoring a voltage level across a storage capacitor;
comparing the voltage level to a reference voltage; and
generating the optical control signal to indicate to the first connector housing to increase the power level when the voltage level drops below the reference voltage.

12. The method of claim 11, wherein powering the components within the second connector housing with the optical power comprises:
converting the optical power to second electrical power within the second connector housing;
charging the storage capacitor with the second electrical power; and
powering the components internal to the second connector from the storage capacitor.

13. The method of claim 11, further comprising:
adjusting a duty cycle of a laser source within the first connector housing in response to the optical control signal fed back from the second connector housing to control the power level of the optical power.

14. The method claim 11 further comprising:
launching a continuity signal into an outbound continuity path;
monitoring a return continuity path for the continuity signal; and
determining whether a fiber breach has occurred between the first connector housing and the second connector housing based on the monitoring.

15. A system, comprising:
a first and second electrical devices including first and second electrical physical interfaces, respectively; and
a photonic cable assembly optically interconnecting the first and second electrical devices, the photonic cable assembly comprising:
a multi-fiber cable including an optical transmit data path, an optical power path, and an optical feedback path;
a power receive cable connector ("PRCC") coupled to the second electrical physical interface and to the multi-fiber cable, the PRCC housing a first optical data receiver coupled to the optical transmit data path, a photonic power converter coupled to the optical power path to covert optical power received over the optical power path to electrical energy to power the first optical data receiver, and a first feedback controller coupled to the optical feedback path to generate a feedback control signal based upon a level of electrical energy; and a power source cable connector ("PSCC") coupled to the first electrical physical interface and housing a first optical data transmitter coupled to the optical transmit data path and a photonic power source for drawing electrical power from the first electrical device and coupled to provide the optical power having a power level selectable based on the feedback control signal to the optical power path;

wherein the system is configured to feed back an optical control signal from a second connector housing to a first connector housing to control the power level of the optical power to adequately power the components of the second connector housing by monitoring a voltage level across a storage capacitor, comparing the voltage level to a reference voltage, and generating the optical control signal to indicate to the first connector housing to increase the power level when the voltage level drops below the reference voltage.

16. The system of claim 15, wherein the PSCC further houses a second feedback controller coupled to control a duty cycle of the photonic power source in response to the feedback control signal received from the PRCC over the optical feedback path.

17. The system of claim 16, wherein the PRCC further houses an energy storage device coupled to the photonic power converter to store the electrical energy, wherein the first feedback controller is coupled to monitor an energy level of the energy storage device and to generate the feedback control signal based on the energy level of the energy storage device.

18. The cable assembly of claim 15,
wherein the PSCC further houses a second optical data receiver,
wherein the fiber cable further includes an optical receive data path coupled to the second optical data receiver, and
wherein the PRCC further houses a second optical data transmitter coupled to the optical receive data path.

19. The cable assembly of claim 15, wherein fiber cable includes an optical continuity path having an outbound path and a return path, the cable assembly further comprising:
a continuity check circuit housed within one of the PRCC or the PSCC and coupled to the continuity path, the continuity check circuit coupled to generate and to monitor a continuity signal on the optical continuity path to determine whether an integrity of the fiber cable has been compromised.

\* \* \* \* \*